United States Patent
Wingen et al.

(10) Patent No.: US 6,742,057 B2
(45) Date of Patent: *May 25, 2004

(54) AUTOMATIC UPGRADEABLE UART CIRCUIT ARRANGEMENT

(75) Inventors: Neal T. Wingen, Algonquin, IL (US); Eric Lai, Cupertino, CA (US); Arnaud Moser, Sunnyvale, CA (US); Ronald De Vries, San Jose, CA (US); Ramaswamy Subramanian, Sunnyvale, CA (US)

(73) Assignee: Koninklijke Philips Electronics N.V., Endhoven (NL)

( * ) Notice: Subject to any disclaimer, the term of this patent is extended or adjusted under 35 U.S.C. 154(b) by 236 days.

This patent is subject to a terminal disclaimer.

(21) Appl. No.: 09/870,917

(22) Filed: May 31, 2001

(65) Prior Publication Data

US 2002/0184411 A1 Dec. 5, 2002

(51) Int. Cl.[7] ................................................ G06F 13/14
(52) U.S. Cl. .................... 710/14; 235/492; 375/377; 375/220; 326/37
(58) Field of Search ................ 710/14; 235/492; 375/220, 377; 326/37

(56) References Cited

U.S. PATENT DOCUMENTS

| 5,619,544 A | * | 4/1997 | Lewis et al. | 375/377 |
| 5,903,601 A | * | 5/1999 | Elnashar et al. | 375/220 |
| 5,923,705 A | * | 7/1999 | Willkie | 375/220 |
| 6,199,764 B1 | * | 3/2001 | Tsai | 235/492 |
| 6,621,293 B2 | * | 9/2003 | Wingen | 326/37 |

* cited by examiner

*Primary Examiner*—Abdelmoniem Elamin
(74) *Attorney, Agent, or Firm*—Peter Zawilski

(57) ABSTRACT

A configurable universal asynchronous receiver/transmitter (UART) facilitates efforts to upgrade UART functionality in the field and replace older UART devices. In one example embodiment, an integrated circuit includes a universal asynchronous receiver/transmitter configured and arranged to operate in one of a plurality of modes, with each mode being selectable in response to mode-selecting data. The integrated circuit device includes an interface circuit electrically connected to the universal asynchronous receiver/transmitter and adapted to present the mode-selecting data to the universal asynchronous receiver/transmitter. The integrated circuit device also includes a selection circuit adapted to enable the mode-selecting data to pass from the interface circuit to the universal asynchronous receiver/transmitter.

17 Claims, 4 Drawing Sheets

US 6,742,057 B2

AUTOMATIC UPGRADEABLE UART CIRCUIT ARRANGEMENT

FIELD OF THE INVENTION

The present device relates generally to data communications circuits and, in particular, to a universal asynchronous receiver/transmitter (UART), which is operable in alternate modes for use with a various CPUs and peripherals.

BACKGROUND OF THE INVENTION

Personal computers have a serial port, which is used for bringing data into and out of the computer. The serial port is used for data movement on a channel that requires that one bit be sent or received after another, thus enabling serial communication. The universal asynchronous receiver/transmitter (UART) is a device usually located on an integrated circuit that performs parallel-to-serial conversion of digital data. A UART communicates between parallel and serial forms by converting received data between parallel I/O devices, such as local CPU, and serial I/O devices, such as POTS modems or other transmission lines. Most all traditional UART devices can be programmed to operate at a selected baud rate, and the newer generation UARTs handle the communication more efficiently largely due to larger FIFO depths and improved flow control (fewer retries required and waits for the internal FIFO to fill or empty).

For many applications, upgrading the functionality of a UART device can be problematic. UART devices are typically mounted on the circuit board at the factory and are not easily replaced in the field when a more powerful UART is available. With the development of new, more powerful UART devices, vendors have to manage more product catalog numbers and increased inventory levels until older generation UARTs are discontinued. Moreover, when systems upgrade to a newer, more powerful UART, the system boards must be modified to accommodate the new UART footprint.

SUMMARY OF THE INVENTION

Various aspects of the present invention are directed to facilitating efforts to upgrade UART functionality in the field, and to approaches for replacing older UART devices. Additional advantages include permitting UART vendors to reduce significantly UART part numbers and product inventory by providing a UART configurable to operate in various modes. The present invention is exemplified in a number of implementations and applications, some of which are summarized below.

According to an example embodiment of the present invention, an integrated circuit device includes a universal asynchronous receiver/transmitter configured and arranged to operate in one of a plurality of modes, with each mode being selectable in response to mode-selecting data. The integrated circuit device includes an interface circuit electrically connected to the universal asynchronous receiver/transmitter and adapted to present the mode-selecting data to the universal asynchronous receiver/transmitter. The integrated circuit device also includes a selection circuit adapted to enable the mode-selecting data to pass from the interface circuit to the universal asynchronous receiver/transmitter.

More particular implementations of the present invention include providing specific modes selectable by the selection circuit including, as examples, an extended FIFO mode in which a deeper FIFO is activated for use and flow-control information such as the status of data (or lack thereof) in the FIFO.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawing, in which.

Figure 1:
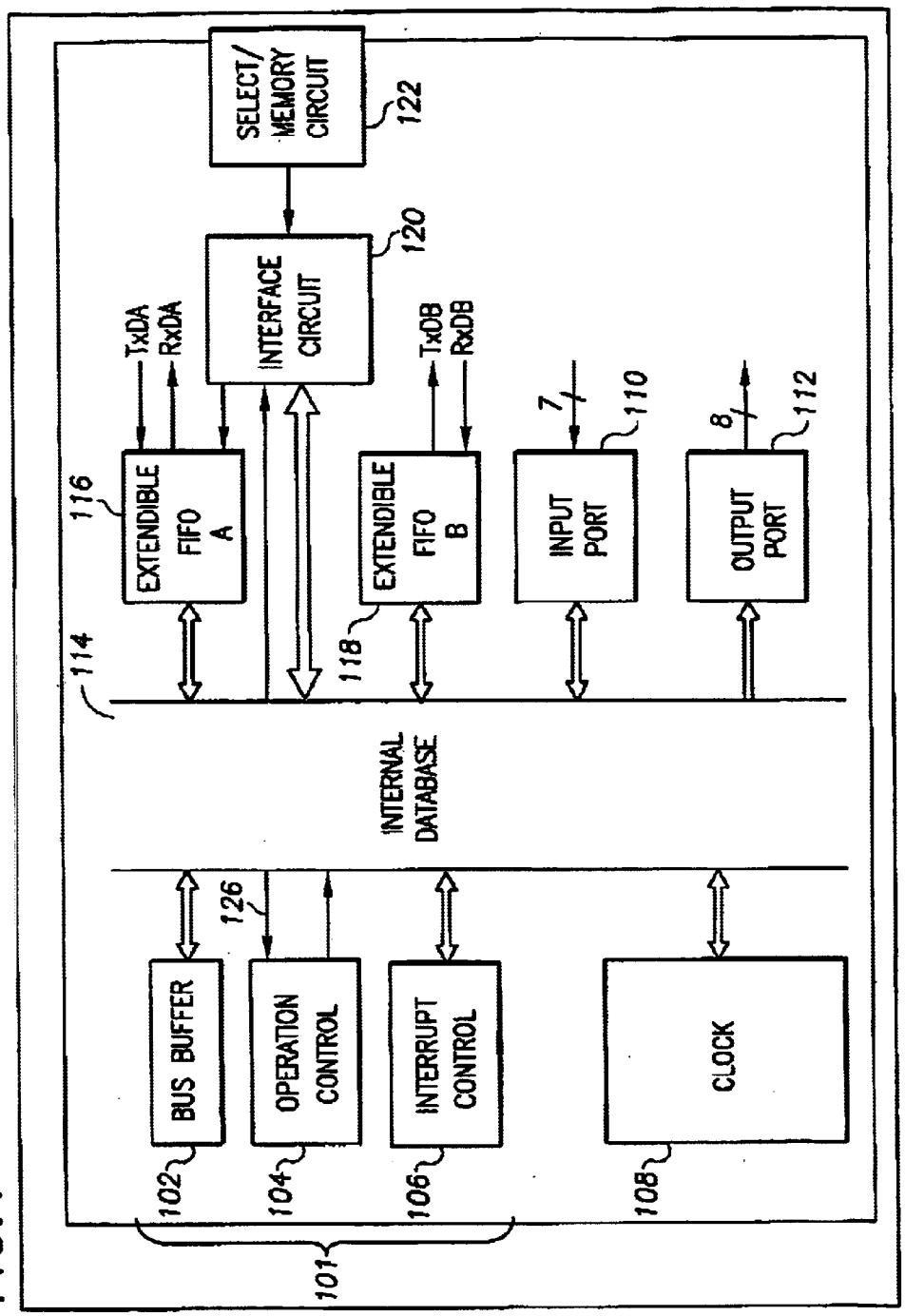
FIG. 1 is a block diagram of a universal asynchronous receiver/transmitter (UART) arrangement, according to an example embodiment of the present invention.

While the invention is amenable to various modifications and alternative forms, specifics thereof have been shown by way of example in the drawing and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally directed to reconfiguring a UART device in an integrated circuit to operate in one of a plurality of feature-enhancing modes. Various embodiments of the present invention are particularly useful in applications benefiting from upgrading a previously used UART in order to provide additional features. While the present invention is not necessarily limited to such devices, an appreciation of various aspects of the invention is best gained through a discussion of various examples in such an application.

In an example embodiment of the present invention, a UART includes circuitry that is selectably configurable to operate in any of a plurality of different modes. Each such mode provides different selectable features. In a particular example, the number of transmit and receive FIFO registers is increased by enabling additional FIFO registers already colocated with the UART arrangement on an integrated chip. An interface circuit presents mode-selecting data to the UART arrangement that determines the operational mode (e.g., active or inactive) of the FIFO registers (or register sets) in the UART arrangement. A selection circuit enables the mode-selecting data to pass from the interface circuit to the UART arrangement.

In addition or in the alternative, the mode-selecting data can enable a flow control circuit within the UART arrangement to indicate various status conditions associated with the communication. In one more particular embodiment, the mode-selecting data enables a flow control circuit within the UART arrangement to provide status conditions from the UART including: whether the FIFO is filled less than a lower threshold level, whether the FIFO is filled more than an upper threshold level, whether the FIFO is empty, whether the FIFO is full, whether an error has occurred due, for example, to the FIFO overflowing or invalid data being drawn from the FIFO.

Referring now to the figures, FIG. 1 is a block diagram of a universal asynchronous receiver/transmitter (UART) arrangement 100 having an extendible FIFO configuration according to an example embodiment of the present invention. UART arrangement 100 includes a bus interface circuit 101 having a bus buffer 102, an operation control circuit 104 and an interrupt control circuit 106. Bus buffer 102 is responsive to operation control circuit 104 and allows read and write operations to occur between the CPU and UART arrangement 100. Operation control circuit 104 receives operation commands from the CPU and generates signals to internal sections of the UART to control UART operation. Interrupt control circuit 104 provides an interrupt upon an occurrence of any one of various events, including the event indicating that the FIFO is full.

In this example embodiment, UART arrangement 100 also includes a clock circuit 108, an input port 110, an output port 112 and an internal data bus 118. Clock circuit 108 is the primary timing source for the UART and includes a crystal oscillator, a baud rate generator and clock selectors. Input and output ports 110 and 112, respectively, are general-purpose input and output ports that can be enabled by various registers, as well as other communicative blocks coupled to the internal bus 114. In this example embodiment, UART arrangement 100 further includes an extendible FIFO A (116) and an extendible FIFO B (118) that are coupled to internal data bus 114 and that are responsive to an interface circuit 120.

Interface circuit 120 includes programmable internal registers (not shown) used to store data bits for reconfiguring the FIFOs 116 and 118 and thereby defining the selected modes of operation for the UART. In one embodiment, the programmable internal registers are set in response to a selection circuit 122 via hard-wired connections or switches (in the factor before encapsulation or in the field after encapsulation). In another embodiment, the programmable internal registers are set in response to mode-select signals sent, via line 126, from the logic used to implement operation control circuit 104. Operation control circuit 104 can be programmed via the internal bus from a circuit outside the UART.

In one example embodiment, the selection circuit is a set of bonding pads (internal to the encapsulated chip or externally available to the printed circuit board) that facilitate customizing FIFO 116 to the customer's specification. In this example, the customer requests an extended FIFO before the product ships. The bonding pads facilitate enabling additional registers during the manufacturing process to extend FIFO 116 before the device is encapsulated.

In a related embodiment, the selection circuit is a nonvolatile memory device, such as a flash memory, an EEROM device or scratch pad register, that facilitates customization of the UART in the field. In these example embodiments, the programmed memory device electronically enables additional features (e.g., extending the FIFO or enabling status reporting) after receiving the configuration access key. The configuration access key, which can be for example a password and authorization code, is stored in the UART's nonvolatile memory location. Depending on the particular implementation and the accessibility of the nonvolatile memory location, the configuration access key can be communicated using a separate dedicated port, using the UART parallel port and/or using the UART serial port (e.g., with special ASCII characters for added security). When using the serial port, upgrades can be made (and tested) from a remote location, for example, by sending to the UART predetermined byte sequences to certain registers.

In a related embodiment, the selection circuit also enables a flow control circuit that indicates if there is an overflow or an underflow condition at the extended FIFO. Upgrade information can travel over the bus interface. Also, the UART, the scratch pad register (SCR) is readily modified for writing the upgrade "key" to, rather than another memory circuit such as 122 of FIG. 1.

Figure 2:
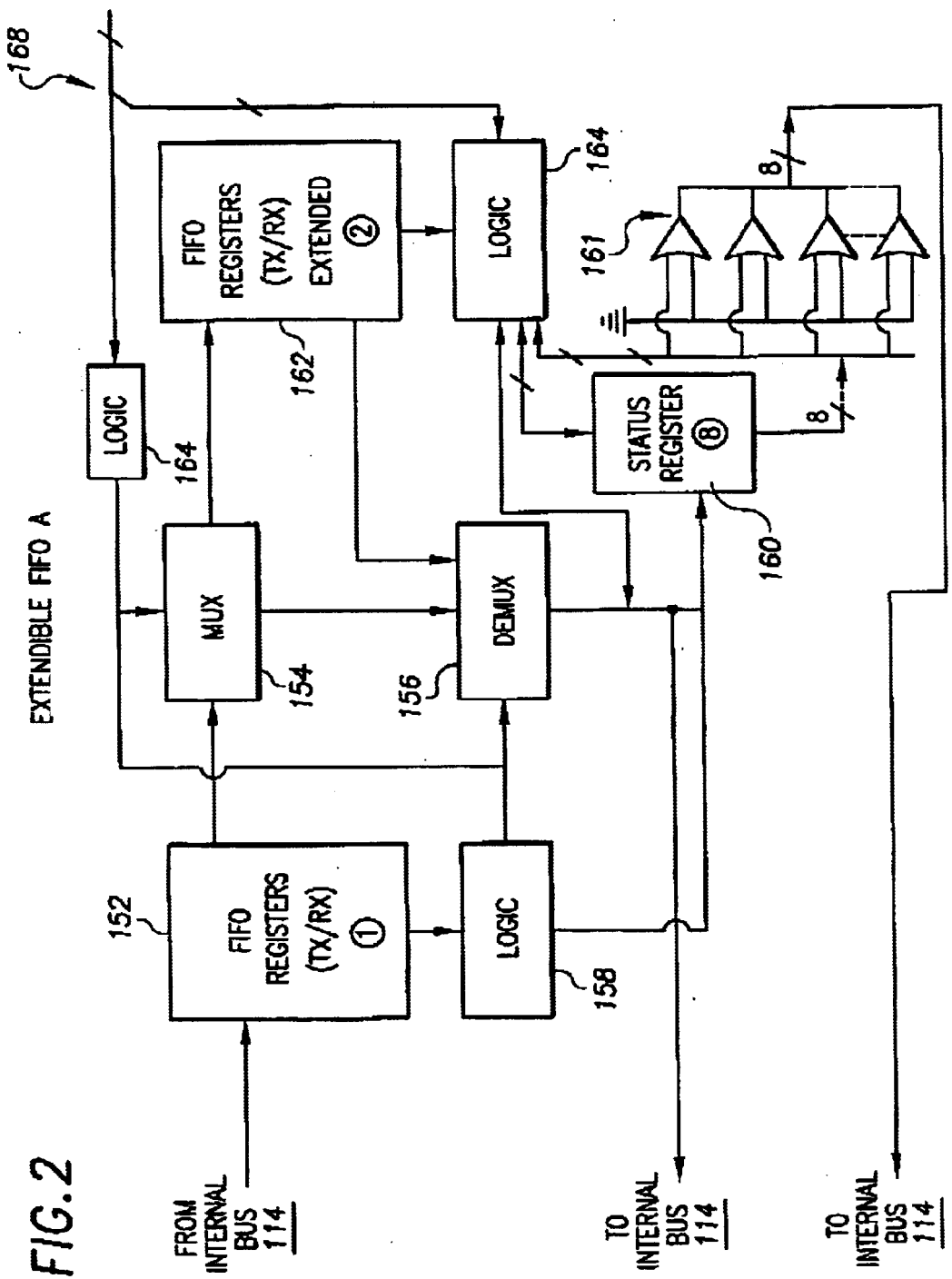
FIG. 2 is a diagram of one of the extendible FIFO blocks of FIG. 1, according to an example embodiment of the present invention.

FIG. 2 illustrates one of the extendible FIFO blocks 116 or 118 of FIG. 1 according to another specific example embodiment of the present invention. In this example embodiment, extendible FIFO 116 includes a set of transmit and receive FIFO registers 152 that receive data from a CPU via internal bus 114. A multiplexer 154 and a demultiplexer 156 process data from registers 152 and indicate to the CPU that data has flowed through registers 152. Under normal operation of FIFO 116, a logic circuit 158 indicates to a status register 160 whether registers 152 are full or empty. The output of status register 160 generates a status (full or empty) of each of the registers of registers 152 via a series of OR gates 161. One of the inputs to OR gates 161 is low (e.g., grounded) while the second input originates from the data received from status register 160. Where the signal at status register 160 indicates a "full" register, a "high" signal appears at one of the inputs of OR gates 161, thereby generating a "high" output at one of OR gates 161. The "high" output signal from OR gates 161 indicates to the CPU that the status of at least one of the registers of registers 152 is "full."

In this example embodiment, the operating mode of FIFO 116 is changed to a different mode exhibiting a different functionality by processing a set of mode-selecting data. In this example, the operating mode of FIFO 116 is changed to an extended FIFO arrangement by the mode-selecting data. By enabling an additional set of FIFO registers 162, FIFO 116 is extended such that data now passes through FIFO registers 152 to registers 162. The delay in the data passing from FIFO registers 152 through demultiplexer 156 to registers 162 indicates to the CPU that the FIFO operating mode has changed; thus, in accordance with the present invention, this configuration change is tested in the field by using conventional data trigger monitors to time and compare the delay of certain data flowing through the FIFO registers. The mode-selecting data from a logic circuit 164, where logic circuit 164 acts as an interface circuit between UART arrangement 100 and a selection circuit 168, reconfigures multiplexer 154 and demultiplexer 156 in response to a selection made at selection circuit 168. Multiplexer 154 is now reconfigured to pass data from registers 152 through to registers 162 while demultiplexer 156 is now reconfigured to process only data received from registers 162. Registers 162 are enabled by the mode-selecting data such that FIFO 116 now operates as an extended FIFO.

In this example embodiment, the mode-selecting data of logic circuit 164 that passes through selection circuit 168 also enables a flow control circuit that indicates the flow status condition of extended FIFO, including FIFO registers 162. In a particular example, the output of OR gates 161 indicate the overflow or underflow status of the extended FIFO. Similar to the discussion above on the status of registers 152, where all of the outputs of OR gates 161 are "high" the CPU receives an indication that there is an overflow condition at the extended FIFO and loss of data is about to occur. Where most of the OR gate 161 outputs are "low," the CPU receives an indication that there is an underflow condition and data is still flowing normally. In a related embodiment, FIFO 116 varies in size as a function of the number of additional registers that selection circuit 168 enables or disables via logic circuit 164. In the example embodiments described, logic circuits include, but are not limited to, bonding circuits or pads and nonvolatile memory circuits, such as flash memory and EEROM.

In an example embodiment, UART arrangement 100 is reconfigured in the field to provide extended FIFO and flow control functionality. During integrated circuit processing, selection circuit 122 of UART arrangement 100 is programmed with a programming password and an authorization code. In reconfiguring the UART in the field, selection circuit 122 receives the programming password and the authorization code and verifies if reconfiguration of FIFO 116 is authorized. Once authorized, FIFO 116 is reconfigured and a new activation code is entered to terminate the reconfiguration. As mentioned above, depending on the accessibility of "key," the configuration can be implemented from various locations. Using the example arrangement of FIG. 2, the key can be sent via the UART parallel or serial port and via the internal bus 114 to the logic circuit 164 where the received key is compared to the key previously-programmed in the memory circuit 122 (or one of the other circuits including nonvolatile registers).

In a related embodiment, entering the original factory authorization code terminates the reconfiguration. Testing can also be performed by monitoring the flow condition at the flow control circuit (i.e., registers 160 and OR gates 161) and verifying the correct status of the reconfiguration of UART arrangement 100. For retrofit compatibility, the UART device pinouts can be scrambled to match the footprint of the desired UART being replaced, thereby ensuring that no changes to the system or printed circuit board are needed.

Figure 3A:
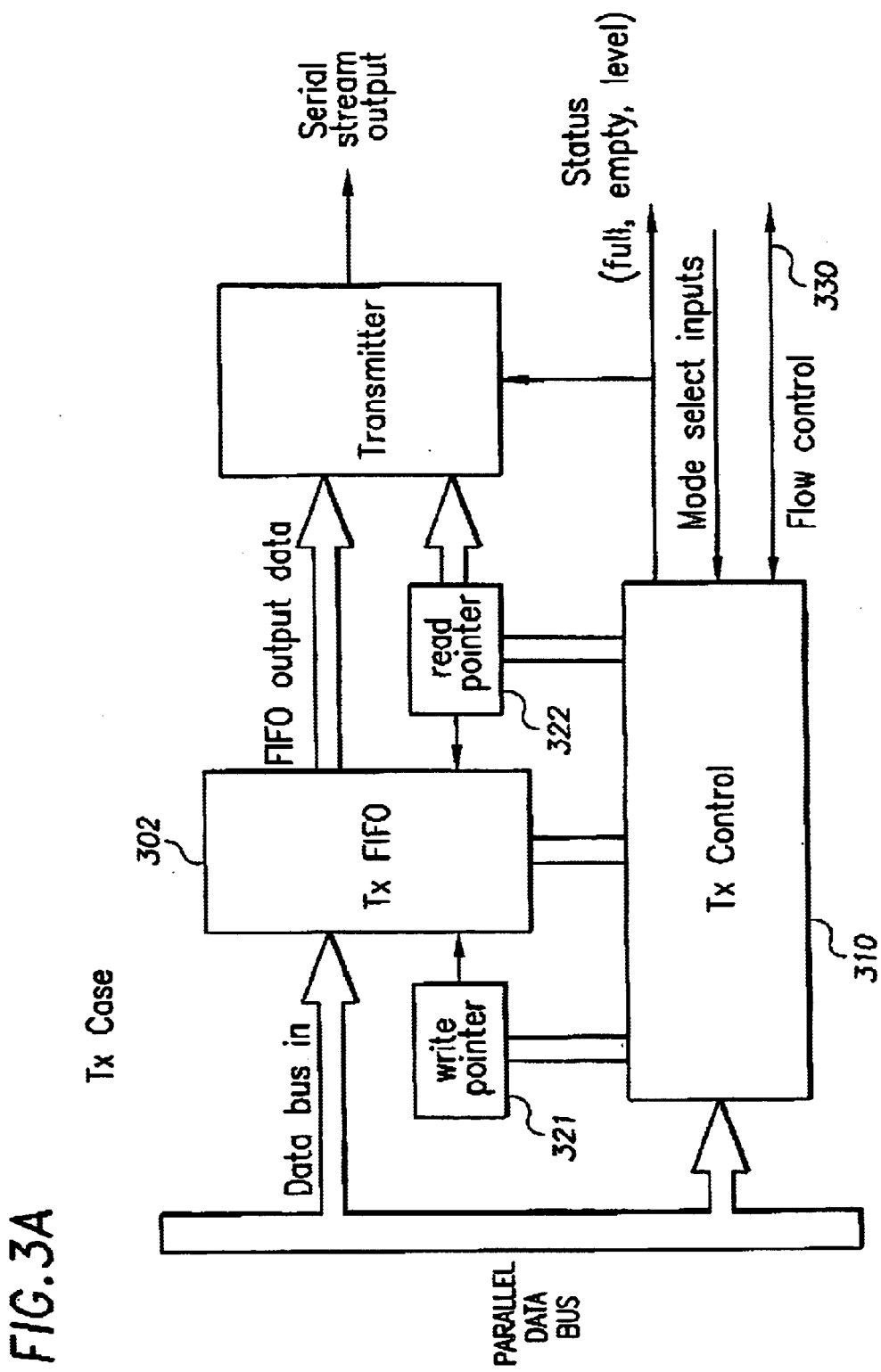
FIGS. 3a and 3b illustrate an alternative approach for providing the extendible FIFO blocks of FIG. 1, with FIG. 3a showing the FIFO being used in a serial-transmit mode and FIG. 3b showing the FIFO being used in a serial-receive mode.
Figure 3B:
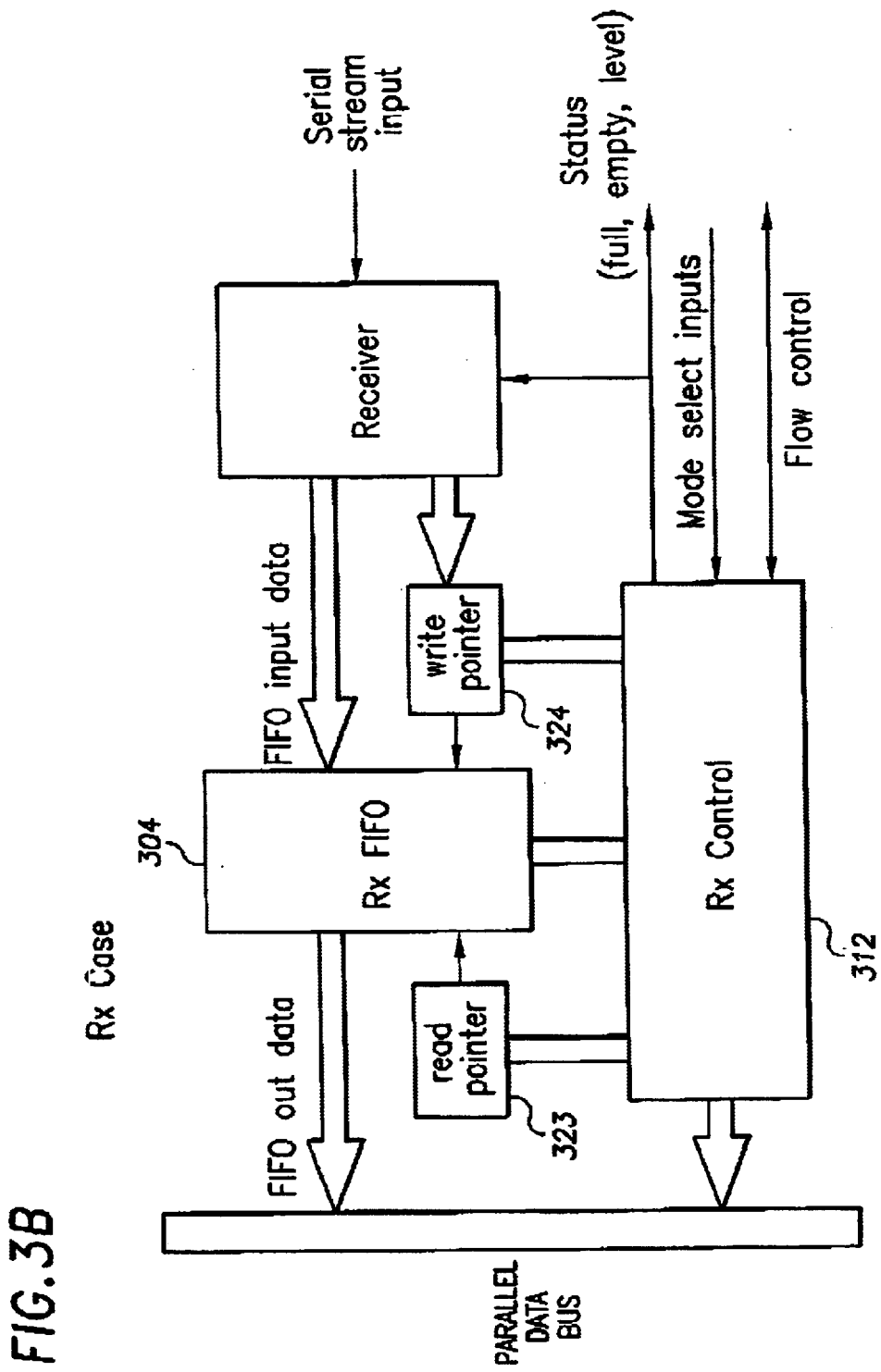

Also according to the present invention, the extendible FIFO structure is realized as depicted in FIGS. 3a and 3b using a single FIFO for each of the transmit and receive sides. Relative to the communication at the UART's serial transmit and receive ports, FIG. 3a shows the FIFO 302 being used in a transmit mode and FIG. 3b shows the FIFO 304 being used in a receive mode. In response to the UART mode-select logic, control logic 310 or 312 control the FIFO's write and read pointers (321–324) to effect a FIFO depth corresponding to the size of the FIFO mode that has been selected. Using the UART mode selects, the control logic 310 or 312 can compare the pointers 321–324 and determine if the FIFO is full, empty or exactly how many bytes it contains. Flow control feedback is provided at line 330. The UART mode select logic indicates whether the FIFO is a certain depth or not, and what other features (e.g., flow control) are available.

The above embodiments can be implemented by modifying commercially-available UART devices to include the above-described operation. For further details on such commercially-available components and their modes of operation, reference may be made to Product Specifications, No. 853-1585-23061 (1/31/00) and No. 853-1078-19971 (9/4/98), for UART part numbers SCC2691AC1A28 and SC26C92A1A UART part numbers; each being commercially available from Philips Semiconductor and incorporated herein by reference. In various example embodiments, the above-described UART arrangements are formed in a single integrated chip, and arranged using discrete components.

While the present invention has been described with reference to several particular example embodiments, those skilled in the art will recognize that many changes may be made thereto without departing from the spirit and scope of the present invention, which is set forth in the following claims.

What is claimed is:

1. An integrated circuit device, comprising:
   a universal asynchronous receiver/transmitter configured and arranged to operate in one of a plurality of modes, each mode being selectable in response to mode-selecting data;
   an interface circuit electrically connected to the universal asynchronous receiver/transmitter and adapted to present the mode-selecting data to the universal asynchronous receiver/transmitter; and
   a selection circuit adapted to enable the mode-selecting data to be passed from the interface circuit to the universal asynchronous receiver/transmitter.

2. The integrated circuit device of claim 1, wherein the interface circuit includes a bonding circuit.

3. The integrated circuit device of claim 1, wherein the interface circuit includes a nonvolatile memory circuit.

4. The integrated circuit device of claim 3, wherein the nonvolatile memory circuit includes a flash memory.

5. The integrated circuit device of claim 3, wherein the nonvolatile memory circuit includes an EEROM.

6. The integrated circuit device of claim 1, wherein the interface circuit includes a bonding circuit adapted to enable the nonvolatile memory circuit to pass data for selecting one of the modes of the universal asynchronous receiver/transmitter.

7. The integrated circuit device of claim 6, wherein the interface circuit includes a bonding circuit adapted to interconnect the nonvolatile memory circuit and the universal asynchronous receiver/transmitter, and permit data to be passed for selecting one of the modes of the universal asynchronous receiver/transmitter.

8. The integrated circuit device of claim 1, wherein the universal asynchronous receiver/transmitter includes an extendible FIFO having one of a plurality of sizes selectable by the mode-selecting data.

9. The integrated circuit device of claim 1, wherein the universal asynchronous receiver/transmitter includes a flow-control circuit adapted to be enabled by the mode-selecting data.

10. The integrated circuit device of claim 1, wherein the universal asynchronous receiver/transmitter includes an extendible FIFO having one of a plurality of sizes selectable by the mode-selecting data, and wherein the universal asynchronous receiver/transmitter includes a flow-control circuit adapted to be enabled by the modes electing data and to indicate at least one flow-status condition of the FIFO.

11. An integrated circuit device, comprising:
   a universal asynchronous receiver/transmitter configured and arranged to operate in one of a plurality of modes, each mode being selectable in response to mode-selecting data;
   interface means, electrically connected to the universal asynchronous receiver/transmitter, for presenting the mode-selecting data to the universal asynchronous receiver/transmitter; and
   selection means for enabling the mode-selecting data to be passed from the interface circuit to the universal asynchronous receiver/transmitter.

12. The integrated circuit device of claim 11, wherein the interface means includes at least one of: a bonding circuit and a nonvolatile memory circuit.

13. The integrated circuit device of claim 11, wherein the universal asynchronous receiver/transmitter includes an extendible FIFO having one of a plurality of sizes selectable by the mode-selecting data, and wherein the universal asynchronous receiver/transmitter includes a flow-control circuit adapted to be enabled by the mode-selecting data.

14. A method for configuring operation of a universal asynchronous receiver/transmitter in an integrated circuit device, the method comprising:

proveriding the universal asynchronous receiver/transmitter with one of a plurality of operational modes;

presenting mode-selecting data to the universal asynchronous receiver/transmitter through an interface circuit in the device; and selecting one of the operational modes for operating the universal asynchronous receiver/transmitter by enabling the mode-selecting data to be passed from the interface circuit to the universal asynchronous receiver/transmitter.

15. The method of claim 14, wherein the universal asynchronous receiver/transmitter includes an extendible FIFO having one of a plurality of sizes selectable by the mode-selecting data, and wherein selecting one of the operational modes for operating the universal asynchronous receiver/transmitter includes selecting one of the plurality of sizes.

16. The method of claim 14, wherein the universal asynchronous receiver/transmitter includes a flow-control circuit adapted to be enabled by the mode-selecting data, and wherein selecting one of the operational modes for operating the universal asynchronous receiver/transmitter includes enabling the flow-control circuit.

17. The method of claim 14, wherein the universal asynchronous receiver/transmitter includes an extendible FIFO having one of a plurality of sizes selectable by the mode-selecting data, and wherein the universal asynchronous receiver/transmitter includes a flow-control circuit adapted to be enabled by the mode-selecting data, and wherein selecting one of the operational modes for operating the universal asynchronous receiver/transmitter includes both selecting one of the plurality of sizes and enabling the flow-control circuit.

* * * * *